United States Patent
Yoshida et al.

(10) Patent No.: US 12,036,876 B2
(45) Date of Patent: Jul. 16, 2024

(54) VEHICLE DRIVE DEVICE

(71) Applicant: Mitsubishi Electric Corporation, Tokyo (JP)

(72) Inventors: Taichi Yoshida, Tokyo (JP); Kazuki Konishi, Tokyo (JP); Naoki Nishio, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 964 days.

(21) Appl. No.: 16/966,578

(22) PCT Filed: Feb. 7, 2018

(86) PCT No.: PCT/JP2018/004126
§ 371 (c)(1),
(2) Date: Jul. 31, 2020

(87) PCT Pub. No.: WO2019/155536
PCT Pub. Date: Aug. 15, 2019

(65) Prior Publication Data
US 2020/0361322 A1    Nov. 19, 2020

(51) Int. Cl.
*B60W 20/50*    (2016.01)
*B60K 6/365*    (2007.10)
(Continued)

(52) U.S. Cl.
CPC .............. *B60L 50/13* (2019.02); *B60L 15/20* (2013.01); *B60L 53/22* (2019.02); *B60L 2210/30* (2013.01); *B60L 2210/40* (2013.01)

(58) Field of Classification Search
None
See application file for complete search history.

(56) References Cited

U.S. PATENT DOCUMENTS

| | | | | |
|---|---|---|---|---|
| 6,087,791 A | * | 7/2000 | Maruyama | ............ B60L 50/13 318/140 |
| 2017/0129478 A1 | * | 5/2017 | Minegishi | ............ B60L 50/16 |

FOREIGN PATENT DOCUMENTS

| | | |
|---|---|---|
| JP | S605703 A | 1/1985 |
| JP | H0698412 A | 4/1994 |
| JP | 2000115907 A | 4/2000 |

OTHER PUBLICATIONS

Office Action mailed on Jun. 14, 2021, for corresponding Indian patent Application No. 202027032809, 5 pages.

(Continued)

*Primary Examiner* — Richard A Goldman
*Assistant Examiner* — Laura E Linhardt
(74) *Attorney, Agent, or Firm* — BUCHANAN INGERSOLL & ROONEY PC

(57) ABSTRACT

A vehicle drive device includes a generator to output AC power, a converter that converts the AC power into DC power, and an inverter that converts the DC power into AC power. An electric motor is driven by the AC power output by the inverter, and an inverter controller (i) calculates a control command value in accordance with an operation command and (ii) controls the inverter based on the calculated value. A value obtained by dividing (i) an amount of the change in the control command value in a case of an increase of the operation command by (ii) a period from when the operation command changes to when the control command value reaches the control command value corresponding to post-change operation command has a negative correlation with the rotational speed of the electric motor at the time when the operation command changes.

4 Claims, 13 Drawing Sheets

(51) Int. Cl.
*B60K 6/445* (2007.10)
*B60K 6/547* (2007.10)
*B60L 15/20* (2006.01)
*B60L 50/13* (2019.01)
*B60L 53/22* (2019.01)

(56) References Cited

OTHER PUBLICATIONS

Office Action dated Sep. 8, 2020, issued in corresponding Japanese Patent Application No. 2019570186, 8 pages including 4 pages of English translation.
International Search Report (PCT/ISA/210) issued on May 15, 2018, by the Japan Patent Office as the International Searching Authority for International Application No. PCT/JP2018/004126.
Written Opinion (PCT/ISA/237) issued on May 15, 2018, by the Japan Patent Office as the International Searching Authority for International Application No. PCT/JP2018/004126.

\* cited by examiner

VEHICLE DRIVE DEVICE

TECHNICAL FIELD

The present disclosure relates to a vehicle drive device.

BACKGROUND ART

Some rail vehicles run using an internal combustion engine as a power source. An output of the internal combustion engine is controlled in accordance with a notch command input from a master controller provided in a cab. Examples of vehicle drive devices that drive the rail vehicles include a vehicle drive device that uses a generator and an electric motor. The vehicle drive devices each include the generator that is driven by an internal combustion engine to output alternating-current (AC) power, a converter that converts the AC power output by the generator into direct-current (DC) power, and an inverter that converts the DC power into AC power to supply the AC power to the electric motor. The vehicle drive device further includes a control device that controls the output of the inverter in order to obtain an output of the electric motor in accordance with the notch command. As described above, both the output of the internal combustion engine and the output of the electric motor are controlled in accordance with the notch command.

When the output of the electric motor that is a load device for the internal combustion engine increases and the internal combustion engine becomes overloaded, the internal combustion engine may fall into a stall condition. When the internal combustion engine stalls, power for driving the rail vehicle cannot be obtained. Accordingly, it is necessary for the vehicle drive devices to perform inverter control for suppressing an overload of the internal combustion engine. When an acceleration indicated by the notch command is increased in order to suppress the overload of the internal combustion engine, an internal combustion engine-type electric locomotive control device disclosed in Patent Literature 1 delays timing at which a torque command value is increased. By delaying the timing at which the torque command value is increased, the output of the electric motor that is a load device for the generator can be increased after the output of the generator becomes sufficiently high. As a result, the overload of the internal combustion engine can be suppressed.

Specifically, when a notch position is increased from a notch N1 to a notch N2, the internal combustion engine-type electric locomotive control device disclosed in Patent Literature 1 does not increase the torque command value, using a variable R that indicates what engine speed between engine speeds corresponding to the notch N1 and the notch N2 corresponds to a current engine speed, while the variable R is less than a setting value RLM.

CITATION LIST

Patent Literature

Patent Literature 1: Unexamined Japanese Patent Application Publication No. 2000-115907

SUMMARY OF INVENTION

Technical Problem

The setting value RLM used by the internal combustion engine-type electric locomotive control device disclosed in Patent Literature 1 is a constant value regardless of a rotational speed of the electric motor. Accordingly, until the control device for the internal combustion engine-type electric locomotive disclosed in Patent Document 1 starts increasing the torque command value after the notch position is increased, a time lag based on a rotational speed of the engine corresponding to a post-change notch occurs regardless of the rotational speed of the electric motor. Accordingly, when the rail vehicle is stopped at a location of an uphill gradient, even if the master controller is operated to perform power running, the output of the electric motor does not immediately increase, and the rail vehicle may move backward. That is, the responsiveness of the output of the electric motor is reduced by providing the above-described time lag in order to suppress overload of the internal combustion engine, and, when the rail vehicle is stopped at the location of the uphill gradient, a problem arises that the rail vehicle unintentionally moves backward during power running.

In consideration of such circumstances, an object of the present disclosure is to improve the responsiveness of an output of an electric motor at a time of departure of a rail vehicle while suppressing overload of an internal combustion engine.

Solution to Problem

In order to attain the aforementioned objective, a vehicle drive device according to the present disclosure, which is a vehicle drive device that drives a vehicle using, as a power source, an internal combustion engine controlled in accordance with an operation command, includes a generator, a converter, an inverter, an electric motor and an inverter controller. The generator is driven by the internal combustion engine and rotates to output AC power. The converter converts the AC power output by the generator into DC power and outputs the DC power. The inverter converts the DC power output by the converter into AC power and outputs the AC power. The electric motor is driven by the AC power output by the inverter and rotates. The inverter controller (i) calculates a control command value for the inverter in accordance with the operation command and (ii) controls the inverter based on the control command value.

When the operation command changes from a pre-change operation command to a post-change operation command, the inverter controller (i) continuously changes, in accordance with a rotational speed of the electric motor at the time when the operation command changes, the control command value from a control command value corresponding to the pre-change operation command to a control command value corresponding to the post-change operation command and (ii) controls the inverter based on the continuously changed control command value. A value obtained by dividing (i) an amount of the change in the control command value from the control command value corresponding to the pre-change operation command to the control command value corresponding to the post-change operation command in a case of an increase of the operation command by (ii) a period from when the operation command changes to when the control command value reaches the control command value corresponding to the post-change operation command has a negative correlation with the rotational speed of the electric motor at the time when the operation command changes.

Advantageous Effects of Invention

According to the present disclosure, the value obtained by dividing the amount of the change in the control command value in the case of the increase of the operation command by the period from when the operation command changes to when the control command value reaches the control command value corresponding to the post-change operation command has the negative correlation with the rotational speed of the electric motor at the time when the operation command changes, thereby enabling an improvement of the responsiveness of an output of the electric motor at a time of departure of the vehicle while suppressing the overload of the internal combustion engine.

DESCRIPTION OF EMBODIMENTS

A power converter according to embodiments of the present disclosure is described below in detail with reference to drawings. Components that are the same or equivalent are assigned the same reference signs throughout the drawings.

Embodiment 1

Figure 1:
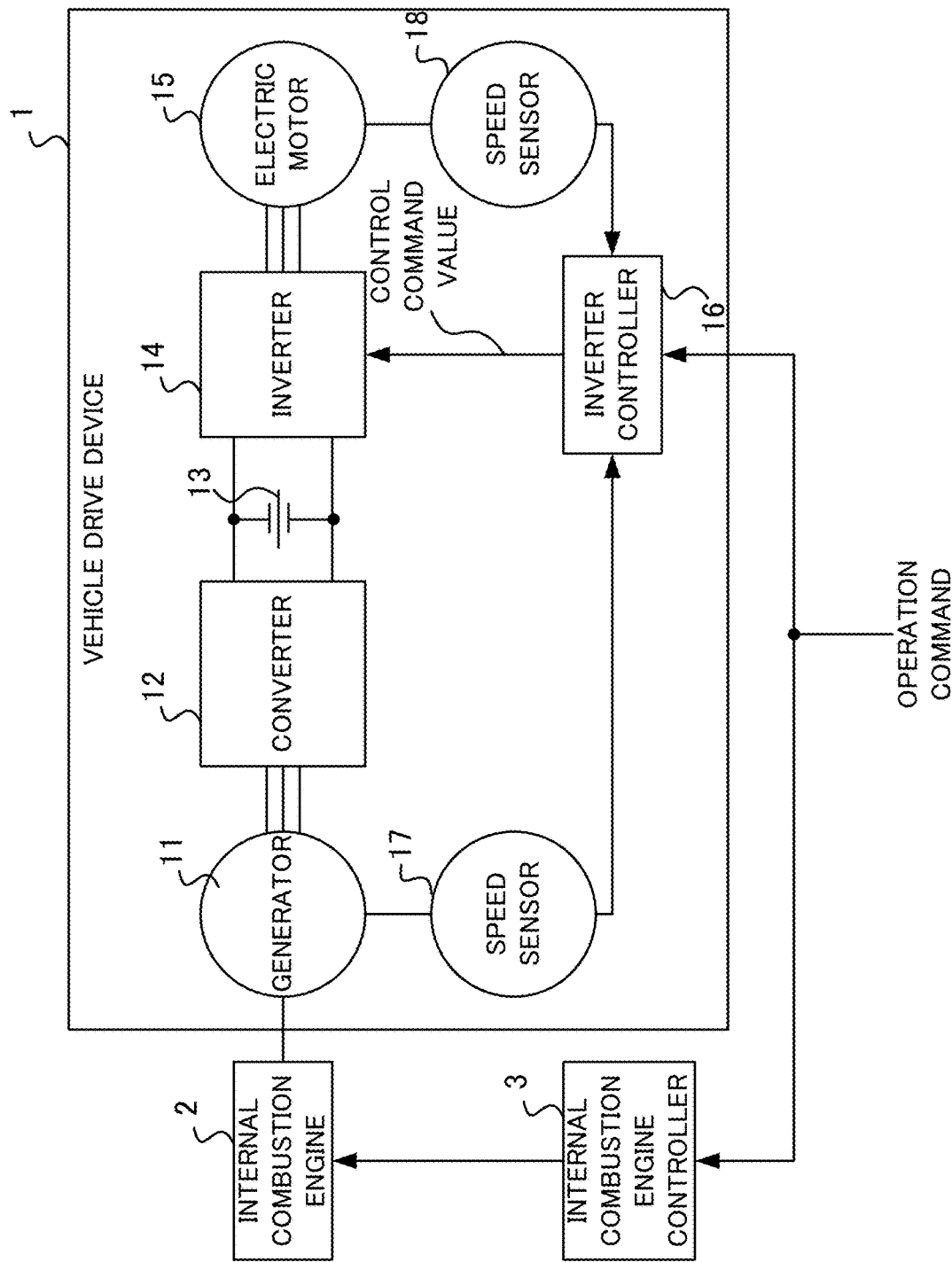
FIG. 1 is a block diagram illustrating a configuration of a vehicle drive device according to Embodiment 1 of the present disclosure.

A vehicle drive device 1 according to Embodiment 1 of the present disclosure, which is illustrated in FIG. 1, drives a rail vehicle using an internal combustion engine 2 as a power source. The internal combustion engine 2 as the power source is controlled by an internal combustion engine controller 3. An operation command is input to the internal combustion engine controller 3. The internal combustion engine controller 3 acquires the operation command from a master controller provided in a non-illustrated cab. The internal combustion engine controller 3 controls the internal combustion engine 2 by (i) calculating an internal combustion engine notch command for the internal combustion engine 2 in accordance with the operation command and (ii) outputting the internal combustion engine notch command to the internal combustion engine 2. The internal combustion engine notch command is a command indicating a rotational speed of the internal combustion engine 2. The internal combustion engine 2 operates in accordance with the internal combustion engine notch command and drives a generator 11 described later. The notch command is input as the operation command. The notch command includes a power running notch and a brake notch. As an example, operation of the vehicle drive device 1 is described below in a case in which a position of the power running notch to be input is defined as N1, N2, and the like, and the higher the position of the power running notch, the higher the output of the internal combustion engine 2 corresponding to the operation command. In other words, the output of the internal combustion engine 2 increases with an increase in the position of the power running notch to N1, N2, and the like.

The vehicle drive device 1 includes (i) a generator 11 that is driven by the internal combustion engine 2 and rotates to output AC power, (ii) a converter 12 that converts the AC power output by the generator 11 into DC power and outputs the DC power, and (iii) an inverter 14 that converts the DC power into AC power and outputs the AC power. The inverter 14 converts the DC power into AC power suitable for driving an electric motor 15 described later. A smoothing filter capacitor 13 is provided between the converter 12 and the inverter 14. The vehicle drive device 1 further includes (i) an electric motor 15 that is driven by the AC power output by the inverter 14 and rotates, and (ii) an inverter controller 16 that controls the inverter 14 in accordance with the operation command. A speed sensor 17 is attached to the generator 11, and a speed sensor 18 is attached to the electric motor 15. The speed sensor 17 includes a pulse generator (PG) and outputs a signal indicating a rotational speed of the generator 11 obtained from a pulse signal output by the PG. Similarly, the speed sensor 18 includes a PG and outputs a signal indicating a rotational speed of the electric motor 15 obtained from a pulse signal output by the PG.

The inverter controller 16 calculates a control command value for the inverter 14 in accordance with the operation command. Specifically, the inverter controller 16 calculates a torque command value as the control command value. The inverter controller 16 outputs the torque command value to the inverter 14. The inverter 14 includes non-illustrated switching elements and a non-illustrated internal controller that switches the switching elements on and off. The internal controller switches the switching element on and off in accordance with the torque command value output by the inverter controller 16.

When the operation command changes, the internal combustion engine controller 3 outputs to the internal combustion engine 2 an internal combustion engine notch command corresponding to the post-change operation command. That is, when the position of the notch command is changed, the rotational speed indicated by the internal combustion engine notch command changes. The rotational speed of the internal combustion engine 2 changes in accordance with the change in the rotational speed indicated by the internal combustion engine notch command. The rotational speed of the internal combustion engine 2 changes continuously. As a result, a rotational speed of the generator 11 changes continuously. Also, when the operation command changes, the inverter controller 16 continuously changes the control command value from the control command value corresponding to the pre-change operation command to the control command value corresponding to the post-change operation command. Specifically, the inverter controller 16 continuously changes the control command value from the control command value corresponding to the position of the pre-change notch command to the control command value corresponding to the position of the post-change notch command. The control command value is continuously changed, thereby continuously changing the rotational speed of the electric motor 15. As described later, the inverter controller 16 delays the start of the change in the control command value in accordance with the rotational speed of the electric motor 15 at the time when the operation command changes, that is, at the time when the position of the notch command is changed. Details of the control by the inverter controller 16 are described.

Figure 2:
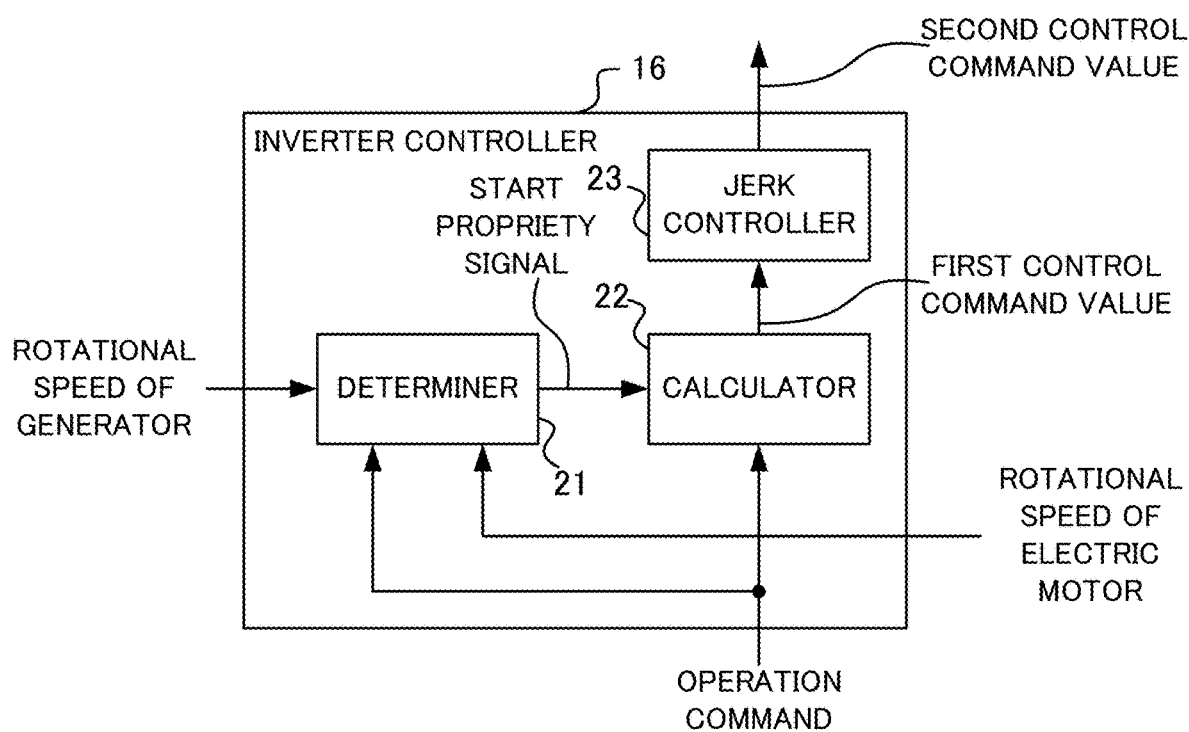
FIG. 2 is a block diagram illustrating a configuration of an inverter controller according to Embodiment 1.

As illustrated in FIG. 2, the inverter controller 16 includes (i) a determiner 21 that determines whether to start changing the control command value when the operation command changes and that outputs a start propriety signal indicating a result of the determination, (ii) a calculator 22 that, based on the start propriety signal, calculates and outputs a control command value corresponding to the operation command, and (iii) a jerk controller 23 that, when the control command value output by the calculator 22 changes, continuously changes the control command value from a pre-change control command value to a post-change control value and outputs the continuously changed control command value. In the below description, the control command value output by the calculator 22 is referred to as a first control command value, and is distinguished from the control command value output by the jerk controller 23, that is, the control command value output by the inverter controller 16, that is referred to as a second control command value.

Figure 3:
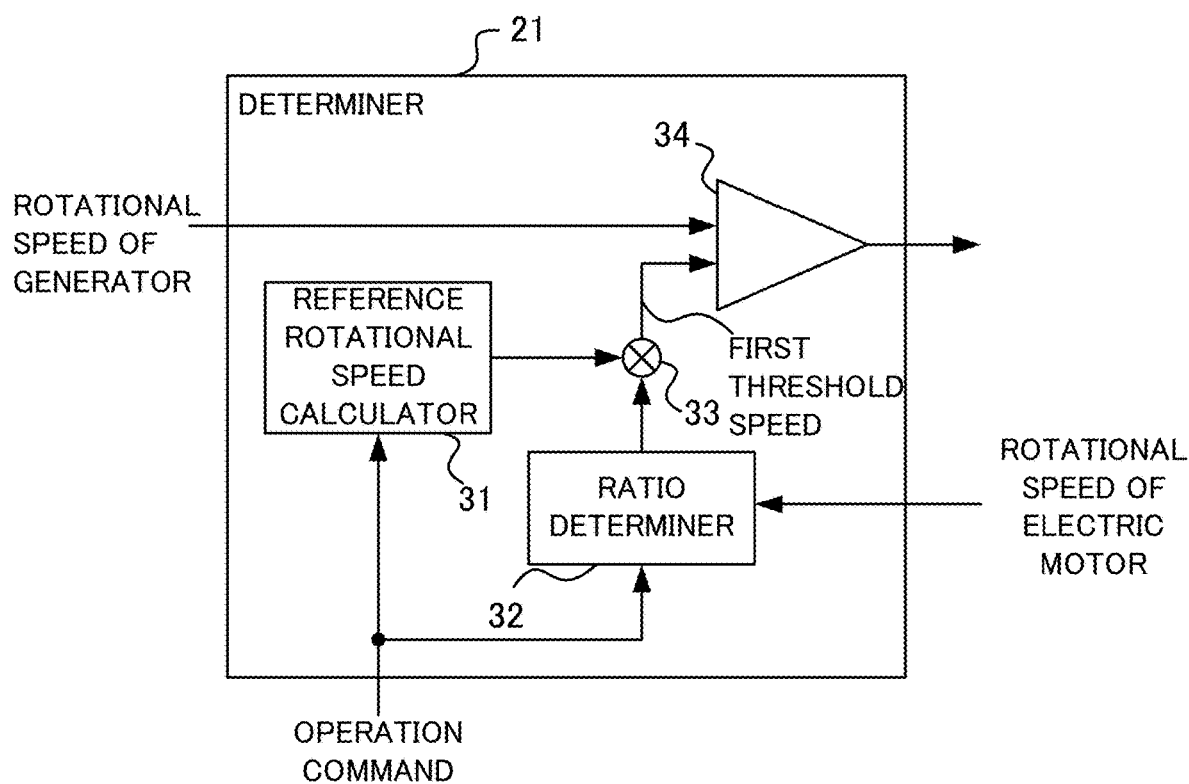
FIG. 3 is a block diagram illustrating a configuration of a determiner according to Embodiment 1.

When the operation command changes, the determiner 21 determines, based on whether the rotational speed of the generator 11 is equal to or higher than a first threshold speed, whether to start changing the second control command value. As described later, the first threshold speed is a speed having a positive correlation with the rotational speed of the electric motor 15 at the time when the operation command changes. As illustrated in FIG. 3, the determiner 21 includes (i) a reference rotational speed calculator 31 that calculates the rotational speed of the generator 11 in accordance with the operation command, and (ii) a ratio determiner 32 that determines and outputs a ratio based on the rotational speed of the electric motor 15 at the time when the operation command changes. The determiner 21 further includes (i) a multiplier 33 that outputs a result obtained by multiplying the rotational speed of the generator 11 calculated by the reference rotational speed calculator 31 by the ratio determined by the ratio determiner 32, and (ii) a comparator 34 that compares the rotational speed of the generator 11 with the output of the multiplier 33.

Figure 4:
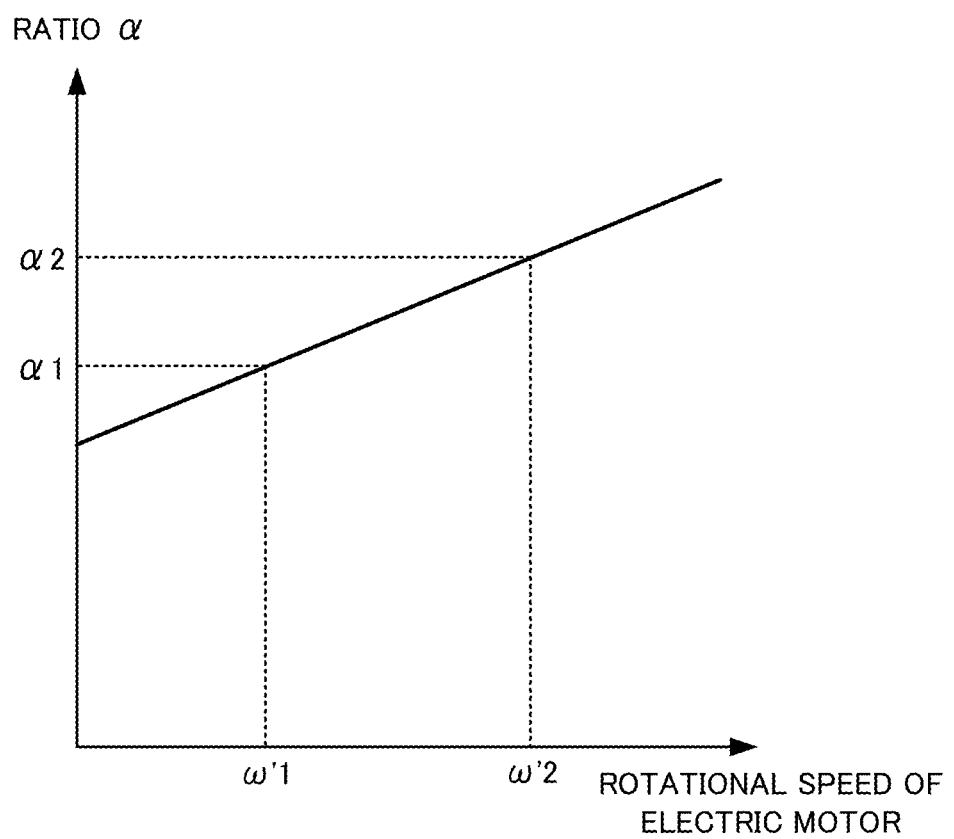
FIG. 4 is a graph illustrating an example of a function for calculating a ratio in accordance with a rotational speed of an electric motor of Embodiment 1.

The reference rotational speed calculator 31 holds a generator speed table in which operation commands are associated with rotational speeds of the generator 11. The reference rotational speed calculator 31 calculates, based on the operation command acquired from the master controller and the generator speed table, the rotational speed of the generator 11 corresponding to the operation command. As illustrated in FIG. 4, the ratio determiner 32 holds a function for calculating a ratio α corresponding to the rotational speed of the electric motor 15. Also, the ratio determiner 32 obtains the rotational speed of the electric motor 15 from the signal output by the speed sensor 18. When the ratio determiner 32 detects that the operation command changes, the ratio determiner 32 determines the ratio α based on (i) the rotational speed of the electric motor 15 at the time when the operation command changes and (ii) the function illustrated in FIG. 4. The ratio α is a positive number equal to or less than 1 and has a positive correlation with the rotational speed of the electric motor 15 at the time when the operation command changes, as illustrated in FIG. 4. In the example of FIG. 4, the rotational speeds ω'1 and ω'2 of the electric motor 15 are assumed to satisfy the relation, ω<1<ω'2. Since the ratio α is determined using the linear function illustrated in FIG. 4, a ratio α2 corresponding to the rotational speed ω'2 is greater than a ratio α1 corresponding to the rotational speed ω'1. That is, within the range of up to 1, the ratio α increases with increase in the rotational speed of the electric motor 15 at the time when the operation command changes. In other words, the ratio α at a time when the vehicle is stopped is less than the ratio α at a time when the vehicle travels.

The multiplier 33 outputs a first threshold speed that is a result of multiplying the rotational speed of the generator 11 calculated by the reference rotational speed calculator 31 by the ratio determined by the ratio determiner 32. The comparator 34 outputs the start propriety signal the signal level of which changes in accordance with a magnitude relationship between the rotational speed of the generator 11 and the first threshold speed. When the rotational speed of the generator 11 is less than the first threshold speed, the start propriety signal is at a low (L) level. When the rotational speed of the generator 11 is equal to or higher than the first threshold speed, the start propriety signal is at a high (H) level.

By the above-described configuration, when the rotational speed of the generator 11 is less than the first threshold speed, the determiner 21 determines that the second control command value is not started changing, and outputs a start propriety signal at the L-level. On the other hand, when the rotational speed of the generator 11 is equal to or higher than the first threshold speed, the determiner 21 determines that the second control command value is not started changing, and outputs an H-level start propriety signal.

As illustrated in FIG. 2, the calculator 22 acquires the operation command and the start propriety signal output by the determiner 21. The calculator 22, based on the start propriety signal, calculates and outputs the first control command value corresponding to the operation command. Specifically, the calculator 22 outputs the first control command value corresponding to the pre-change operation command, while the start propriety signal is at the L level, in a case in which the operation command changes. On the other hand, in a case in which the operation command changes and the start propriety signal is at the H level, the calculator 22 outputs the first control command value corresponding to the post-change operation command.

The jerk controller 23 acquires the first control command value from the calculator 22. A case in which the first control command value changes from Tr to Tr' is described as an example. In a case in which the first control command value changes, the jerk controller 23 outputs the second control command value that continuously changes from the pre-change first control command value Tr to the post-change first control command value Tr'. Specifically, the jerk controller 23 outputs the second control command value that continuously changes at a constant change rate from the pre-change first control command value Tr to the post-change first control command value Tr'.

Inverter control performed by the inverter controller 16 having the above-described configuration is described with reference to FIGS. 5 and 6. An example is described in which the railway vehicle is started by inputting a power running notch from a state in which a brake notch B is input as the operation command and thus the railway vehicle is stopped. In the below description, the power running notches of the positions N1 and N2 are denoted as power running notches N1 and N2. In the below-described example, the power running notch N1 is assumed to be input at a time T1, the vehicle is assumed to depart at a time T2, and the second control command value is assumed to reach the control command value corresponding to the power running notch N1 at a time T3. Additionally, the power running notch N2 is assumed to be input at a time T4, the second control command value is assumed to start increasing at a time T5, and the second control command value is assumed to reach the control command value corresponding to the power running notch N2 at a time T6.

Figure 5:
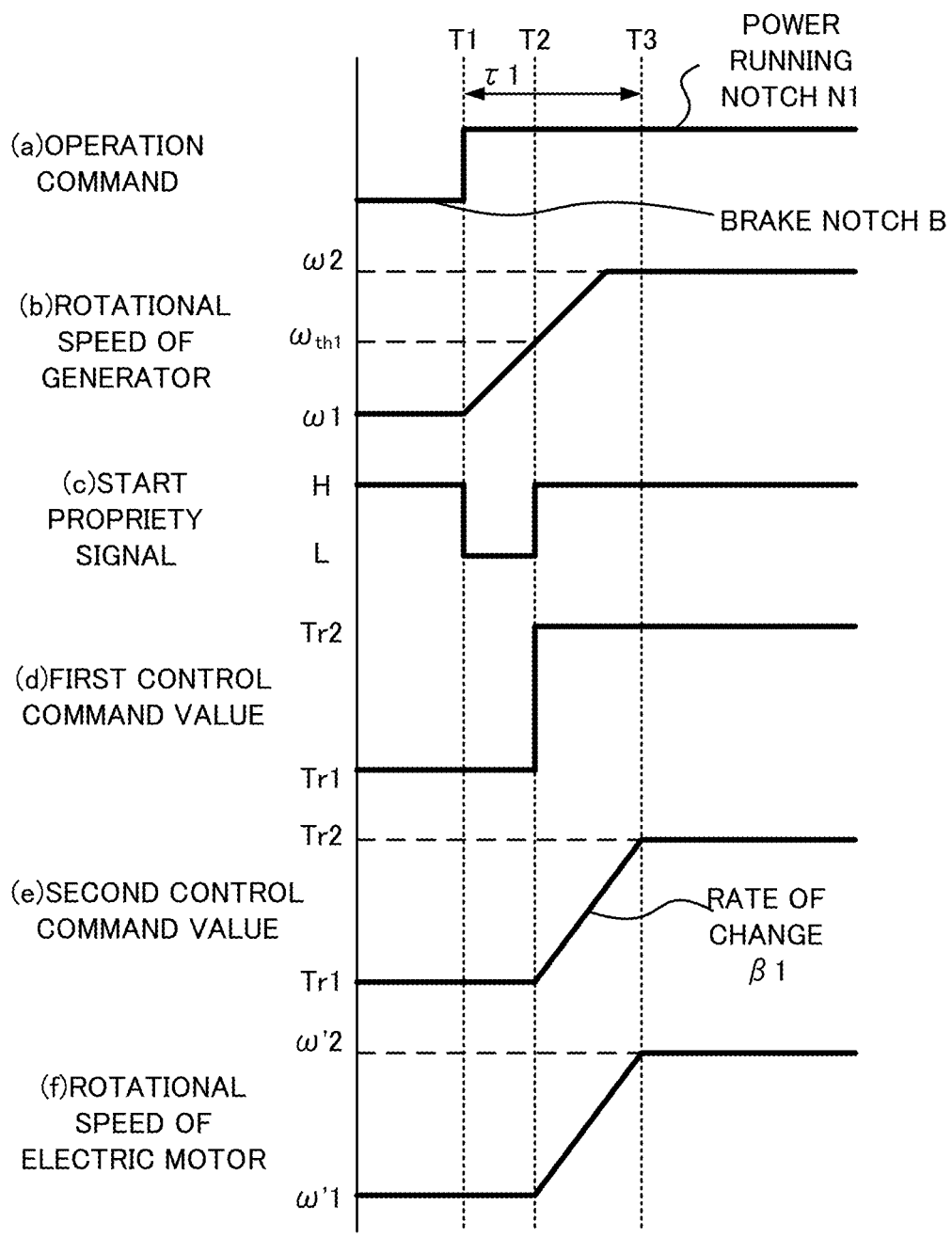
FIG. 5 is a timing chart illustrating a change in a control command value in Embodiment 1.
Figure 6:
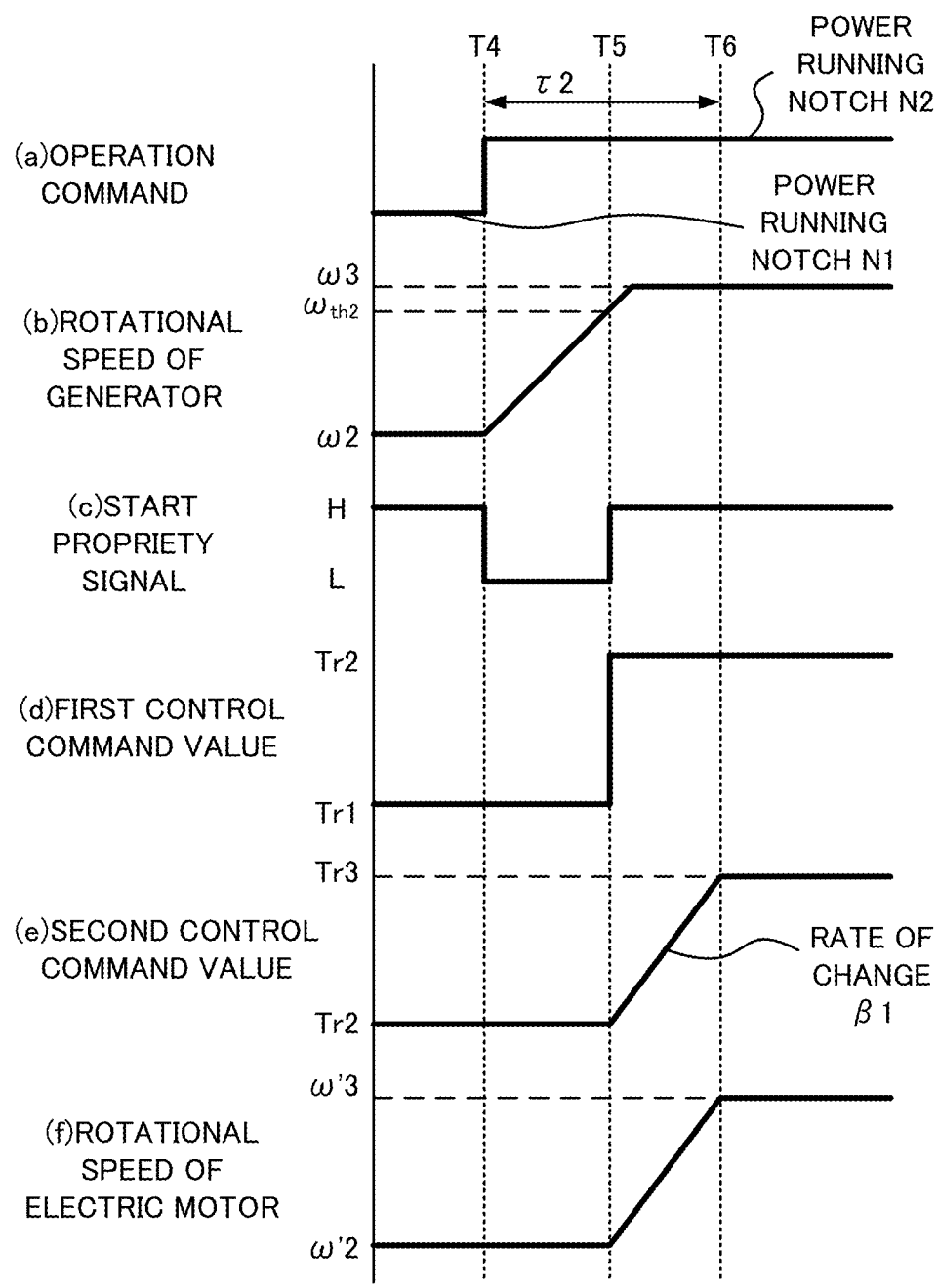
FIG. 6 is a timing chart illustrating a change in the control command value in Embodiment 1.

In FIGS. 5 and 6, "(a)" illustrates a time-series change in the operation command input to the inverter controller 16. In FIGS. 5 and 6, "(b)" illustrates a time-series change in the rotational speed of the generator 11. In FIGS. 5 and 6, "(c)" illustrates a time-series change in the start propriety signal output by the determiner 21. In FIGS. 5 and 6, "(d)" illustrates a time-series change in the first control command value output by the calculator 22. In FIGS. 5 and 6, "(e)" illustrates a time-series change in the second control command value output by the inverter controller 16. In FIGS. 5 and 6, "(f)" illustrates a time-series change in the rotational speed of the electric motor 15.

As illustrated in "(a)" of FIG. 5, the brake notch B is input to the vehicle drive device 1 as the operation command by the master controller until the time T1. Until the time T1, an acceleration of the railway vehicle corresponding to the operation command is zero. The generator 11 is controlled based on an internal combustion engine notch command corresponding to the brake notch B. The rotational speed of the generator 11 is a rotational speed ω1 (=0) corresponding to the brake notch B. The reference rotational speed calculator 31 calculates the rotational speed of the generator 11 corresponding to the brake notch B to obtain zero as a result of the calculation. Accordingly, the first threshold speed is 0 until time T1. Since the rotational speed of the generator 11 coincides with the first threshold speed, the start propriety signal is at the H level. The inverter controller 16 outputs a control command value Tr1 (=0) corresponding to the brake notch B. The electric motor 15 is controlled by the control command value Tr1, and the rotational speed of the electric motor 15 is a rotational speed ω'1 (=0) corresponding to the brake notch B.

When power running notch N1 is input at the time T1, the rotational speed indicated by the internal combustion engine notch command increases. As the rotational speed indicated by the internal combustion engine notch command increases, the rotational speed of the generator 11 increases as illustrated in "(b)" of FIG. 5. When the power running notch N1 is input, the reference rotational speed calculator 31 calculates and outputs the rotational speed ω2 of the generator 11 corresponding to the power running notch N1 that is the post-change operation command. The ratio determiner 32 detects a change in the operation command and outputs the ratio α1 based on the rotational speed ω'1 of the electric motor 15 at the time T1. The multiplier 33 outputs a first threshold speed $ω_{th1}$ that is the result of multiplying the rotational speed ω2 by the ratio α1. Since the rotational speed of the generator 11 is less than the first threshold speed $ω_{th1}$ until the time T2, the start propriety signal is at the L level as illustrated in "(c)" of FIG. 5. Since the start propriety signal is at the L level until the time T2, the calculator 22 outputs the first control command value Tr1 corresponding to the brake notch B as illustrated in "(d)" of FIG. 5. Accordingly, as illustrated in "(e)" of FIG. 5, the inverter controller 16 outputs the second control command value Tr1 until the time T2. Thus, as illustrated in "(f)" of FIG. 5, the rotational speed of the electric motor 15 remains the rotational speed ω'1.

When the rotational speed of the generator 11 reaches the first threshold speed $ω_{th1}$ at the time T2, the start propriety signal reaches the H level. When the start propriety signal reaches the H level, the calculator 22 outputs a first control command value Tr2 corresponding to the power running notch N1. Since the first control command value changes from Tr1 to Tr2, the jerk controller 23 continuously changes the second control command value from Tr1 to Tr2 at a rate of change β1. The rate of change β1 is taken to be a fixed value. As the second control command value increases from the value Tr1 to the value Tr2, the rotational speed of the electric motor 15 increases from the rotational speed ω'1 to ω'2. At the time T3, the second control command value reaches the value Tr2, and the rotational speed of the electric motor 15 reaches the rotational speed ω'2.

As illustrated in "(a)" of FIG. 6, after the time T3, the power running notch N1 is input until the time T4, and the rotational speed of the generator 11 is ω2 from the time T3 to the time T4, and the rotational speed of the electric motor 15 is ω'2 from the time T3 to the time T4.

The power running notch N2 is input at the time T4, and the rotational speed indicated by the internal combustion engine notch command increases. As the rotational speed indicated by the internal combustion engine notch command increases, the rotational speed of the generator 11 increases as illustrated in "(b)" of FIG. 6. The rotational speed of the generator 11 increases at the same change rate as that when the power running notch N1 is input. Upon input of the power running notch N2, the reference rotational speed calculator 31 calculates and outputs a rotational speed ω3 of the generator 11 corresponding to the power running notch N2 that is the post-change operation command. The ratio determiner 32 detects the change in the operation command and outputs the ratio α2 based on the rotational speed ω'2 of the electric motor 15 at the time T4. Since the ratio α has a positive correlation with the rotational speed of the electric motor 15 at the time when the operation command changes, the ratio α2 is greater than the ratio α1. The multiplier 33 outputs a first threshold speed $ω_{th2}$ that is the result of multiplying the rotational speed ω3 by the ratio α2. Since the rotational speed of the generator 11 is less than the first threshold speed $ω_{th2}$ until the time T5, the start propriety signal is at the L level as illustrated in "(c)" of FIG. 6. Since the start propriety signal is at the L level until the time T5, the calculator 22 outputs the first control command value Tr2 corresponding to the power running notch N1, as illustrated in "(d)" of FIG. 6. Accordingly, as illustrated in "(e)" of FIG. 6, the inverter controller 16 outputs the second control command value Tr2 until the time T5. Thus, as illustrated in "(f)" of FIG. 6, the rotational speed of the electric motor 15 remains the rotational speed ω'2.

When the rotational speed of the generator 11 reaches the first threshold speed $ω_{th2}$ at the time T5, the start propriety signal reaches the H level. When the start propriety signal reaches the H level, the calculator 22 outputs a first control command value Tr3 corresponding to the power running notch N2. Since the first control command value changes from Tr2 to Tr3, the jerk controller 23 continuously changes the second control command value at the rate of change β1 from Tr2 to Tr3. As described above, β1 is taken to be a fixed value. As the second control command value increases from Tr2 to Tr3, the rotational speed of the electric motor 15 increases from ω'2 to ω'3. At the time T6, the second control command value reaches Tr3, and the rotational speed of the electric motor 15 reaches ω'3.

As illustrated in FIG. 5, a symbol T1 denotes a period from when the operation command changes to when the rotational speed of the electric motor 15 reaches ω'2. In the example of FIG. 5, the second control command value increases from the value Tr1 to the value Tr2. That is, an amount of the change in the second control command value is represented by (Tr2−Tr1). Also, as illustrated in FIG. 6, a symbol τ2 denotes a period from when the operation command changes to when the rotational speed of the electric motor 15 reaches ω'3. In the example of FIG. 6, the second control command value increases from the value Tr2 to the value Tr3. That is, an amount of the change in the second control command value can be represented by (Tr3−Tr2). In Embodiment 1, (Tr2−Tr1)=(Tr3−Tr2).

The responsiveness of the electric motor 15 illustrated in FIG. 5 in a case in which the power running notch N1 is inputted as the operation command from the state where the brake notch B is inputted is compared with the responsiveness of the electric motor 15 illustrated in FIG. 6 in a case in which the power running notch N2 is input from the state where the power running notch N1 is inputted as the operation command. Accordingly, a value obtained by dividing the amount of the change in the control command value by the period from when the operation command changes to when the control command value reaches the control command value corresponding to the post-change operation command is defined as a value R indicating responsiveness of the electric motor 15. A value R1 indicating the responsiveness of the electric motor 15 in the example of FIG. 5 can be represented by (Tr2−Tr1)/τ1. Additionally, a value R2 indicating the responsiveness of the electric motor 15 in the example of FIG. 6 can be represented by (Tr3−Tr2)/τ2. In Embodiment 1, the ratio output by the ratio determiner 32 has a positive correlation with the rotational speed of the electric motor 15 at the time when the operation command changes. Accordingly, the higher the rotational speed of the electric motor 15 at the time when the operation command changes, the longer the period from when the operation command changes to when the second control command value output by the inverter controller 16 starts increasing. As a result, the value R indicating the responsiveness of the electric motor 15 has a negative correlation with the rotational speed of the electric motor 15 at the time when the operation command changes. That is, the lower the rotational speed of the electric motor 15 at the time when the operation command changes, the higher the responsiveness of the electric motor 15. In other words, the responsiveness of the electric motor 15 when the vehicle is stopped is higher than the responsiveness of the electric motor 15 when the vehicle travels.

Although the case where the operation command increases is described above, the same applies to the operation of each component of the vehicle drive device 1 when the operation command decreases, for example, when the operation command changes from the power running notch N2 to the power running notch N1. However, when the operation command decreases, the rotational speed of the generator 11 is equal to or higher than the first threshold speed at the time when the operation command changes. Accordingly, when the operation command changes, the second control command value immediately changes.

As described above, in the vehicle drive device 1 according to Embodiment 1 of the present disclosure, the value R indicating the responsiveness of the electric motor 15 has a negative correlation with the rotational speed of the electric motor 15 at the time when the operation command changes, thereby enabling an improvement of the responsiveness of the output of the electric motor 15 at the time of departure of the vehicle while suppressing overload of the internal combustion engine 2.

Embodiment 2

In Embodiment 1, in order that the value R indicating the responsiveness of the electric motor 15 has a negative correlation with the rotational speed of the electric motor 15 at the time when the operation command changes, the first threshold speed $\omega_{th}$ is changed using the ratio α having a positive correlation with the rotational speed of the electric motor 15 at the time when the operation command changes. A method for making the value R have the above-described negative correlation is freely selected. For example, the second control command value may be changed based on the rate of change β that changes in accordance with the rotational speed of the electric motor 15. Embodiment 2 in which both the ratio α and the rate of change β are changed is described below.

Figure 7:
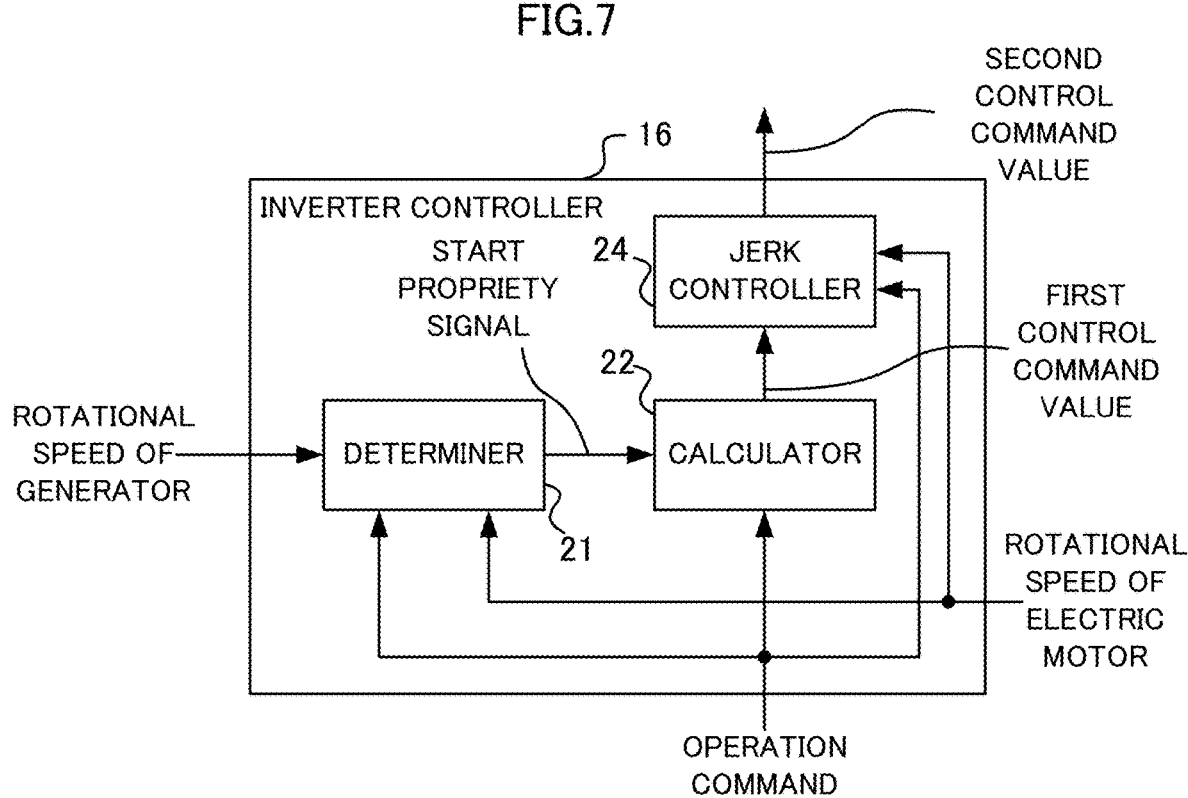
FIG. 7 is a block diagram illustrating a configuration of an inverter controller according to Embodiment 2 of the present disclosure.

The configuration of the vehicle drive device 1 according to Embodiment 2 of the present disclosure is similar to that of the vehicle drive device 1 according to Embodiment 1. As illustrated in FIG. 7, the inverter controller 16 includes a jerk controller 24 instead of the jerk controller 23. The jerk controller 24 acquires the first control command value from the calculator 22. The operation command is input to the jerk controller 24. The jerk controller 24 obtains the rotational speed of the electric motor 15 from a signal output by the speed sensor 18. When the first control command value changes, the jerk controller 24 continuously changes the second control command value based on the rate of change β that has a negative correlation with the rotational speed of the electric motor 15 at the time when the operation command changes.

Figure 8:
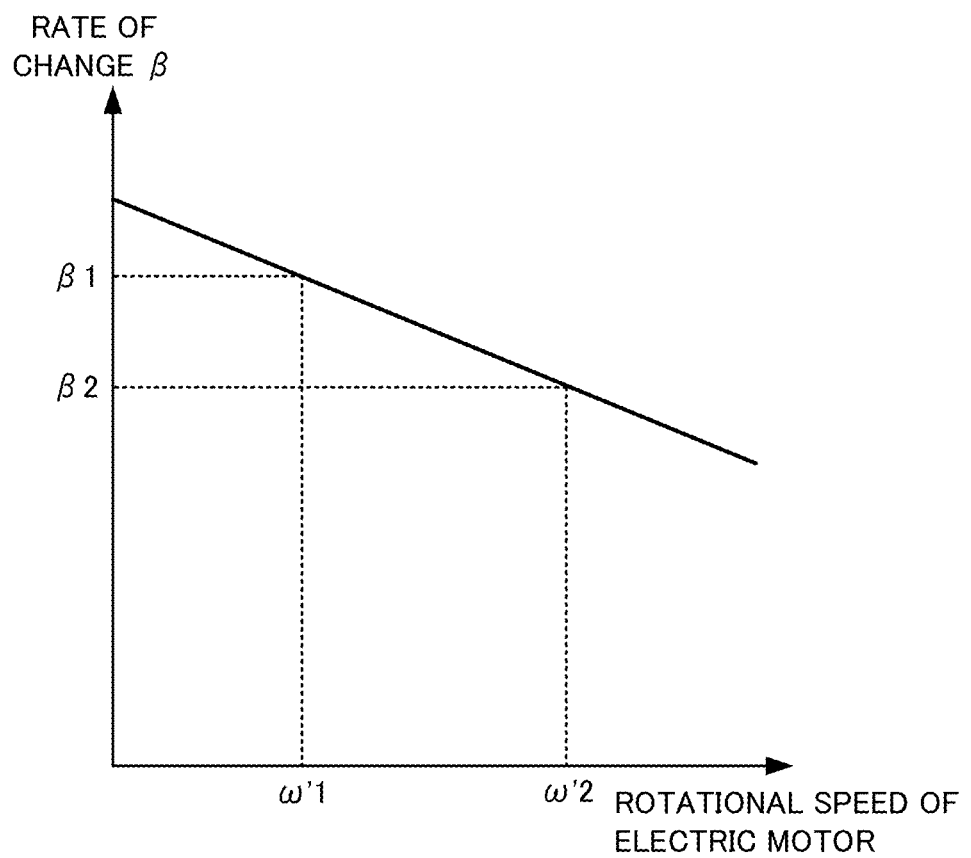
FIG. 8 is a graph illustrating an example of a function for calculating a rate of change in accordance with a rotational speed of an electric motor of Embodiment 2.

Specifically, as illustrated in FIG. 8, the jerk controller 24 holds a function for determining the rate of change β corresponding to the rotational speed of the electric motor 15. When the jerk controller 24 detects a change in the operation command, the jerk controller 24 determines the rate of change β based on (i) the rotational speed of the electric motor 15 at the time when the operation command changes and (ii) the function illustrated in FIG. 8. As illustrated in FIG. 8, the rate of change β has a negative correlation with the rotational speed of the electric motor 15 at the time when the operation command changes. In the example of FIG. 8, the rotational speeds ω'1 and ω'n of the electric motor 15 are assumed to satisfy the relation, ω'1<ω'2. Since the rate of change β is determined using the linear function illustrated in FIG. 8, β2 corresponding to ω'2 is less than β1 corresponding to ω'1. That is, the higher the rotational speed of the electric motor 15 at the time when the operation command changes, the less the rate of change β. In other words, the rate of change β when the vehicle is stopped is greater than the rate of change β when the vehicle travels. When the first control command value output by the calculator 22 changes after the operation command changes, the jerk controller 24 outputs the second control command value that continuously changes, based on the determined rate of change β, from the pre-change first control command value to the post-change first control command value.

Figure 9:
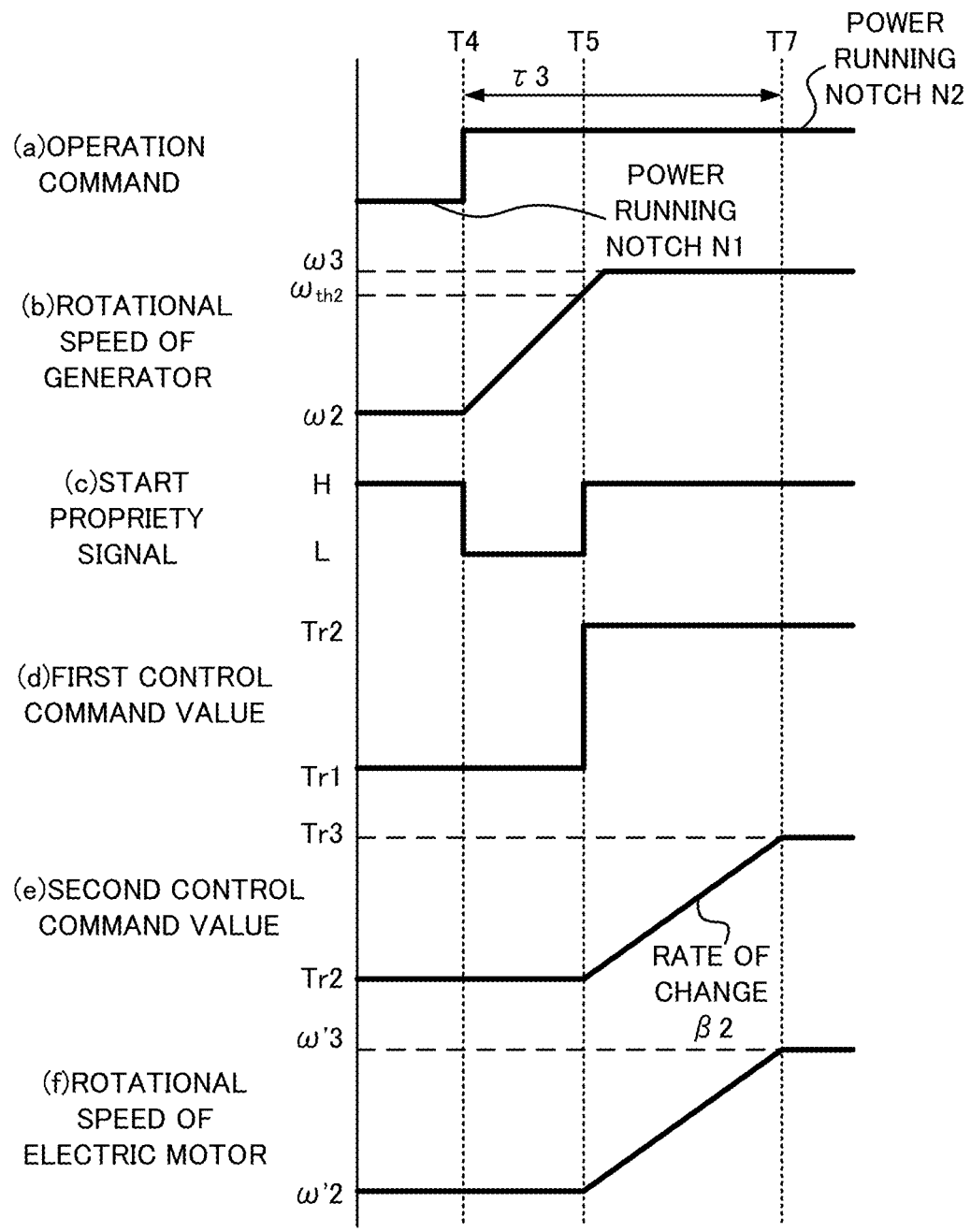
FIG. 9 is a timing chart illustrating a change in a control command value in Embodiment 2.

Inverter control performed by the inverter controller 16 is described with reference to FIGS. 5 and 9. FIG. 9 is annotated in the same the manner as FIG. 5. A time-series change in the operation command until the time T4, a time-series change in the rotational speed of generator 11 until the time T4, a time-series change in the start propriety signal until the time T4, a time-series change in the first control command value until the time T4, a time-series change in the second control command value until the time T4, and a time-series change in the rotational speed of the electric motor 15 until the time T4 are all the same as those in Embodiment 1 illustrated in FIG. 5. As described in Embodiment 1, since the control command value output by the calculator 22 changes from Tr1 to Tr2 at the time T2, the jerk controller 23 continuously changes the control command value from Tr1 to Tr2. The rate of change β of the control command value during the change from Tr1 to Tr2 is the rate of change β1 corresponding to the rotational speed ω'1 of the electric motor 15 at the time T2. Also, a time-series change in the operation command from the time T4 to the time T5, a time-series change in the rotational speed of the generator 11 from the time T4 to the time T5, a time-series change in the start propriety signal from the time T4 to the time T5, a time-series change in the first control command value from the time T4 to the time T5, a time-series change in the second control command value from the time T4 to the time T5, and a time-series change in the rotational speed of the electric motor 15 from the time T4 to the time T5 are all the same as those in Embodiment 1.

The first threshold speed $\omega_{th2}$ is the same as that in Embodiment 1. When the rotational speed of the generator 11 reaches the first threshold speed $\omega_{th2}$ at the time T5, the start propriety signal output by the comparator 34 reaches the H level. When the start propriety signal reaches the H level, the calculator 22 outputs the first control command value Tr3 corresponding to the power running notch N2. Since the first control command value changes from Tr2 to Tr3, the jerk controller 23 continuously changes the second control command value at the rate of change β2 from Tr2 to Tr3. As described above, the rate of change β2 during the change from Tr2 to Tr3 is a value corresponding to the rotational speed ω'2 of the electric motor 15 at the time T4. Since the change rate of the second control command value has a negative correlation with the rotational speed of the electric motor 15 at the time when the operation command changes, the rate of change β2 is less than the rate of change β1. That is, when the second control command value increases from Tr2 to Tr3, a rate of the increase of the second control command value is slower than when the second control command value increases from Tr1 to Tr2. With the increase of the second control command value from Tr2 to Tr3, the rotational speed of the electric motor 15 increases from ω'2 to ω'3. At the time T7, the second control command value reaches Tr3, and the rotational speed of the electric motor 15 reaches ω'3.

As described above, a time-series change in the second control command value until the time T4 is the same as that in Embodiment 1. Accordingly, as illustrated in FIG. 5, a period from when the operation command changes to when the rotational speed of the electric motor 15 reaches ω'2 is denoted by a symbol τ1 as in Embodiment 1. Additionally, as illustrated in FIG. 9, a period from when the operation command changes to when the rotational speed of the electric motor 15 reaches ω'3 is denoted by a symbol τ3. The value R1 indicating the responsiveness of the electric motor 15 in the example of FIG. 5 can be represented by (Tr2−Tr1)/τ1. Additionally, the value R2 indicating the responsiveness of the electric motor 15 in the example of FIG. 9 can be represented by (Tr3−Tr2)/τ3. As in Embodiment 1, the ratio α output by the ratio determiner 32 has a positive correlation with the rotational speed of the electric motor 15 at the time when the operation command changes. Accordingly, the higher the rotational speed of the electric motor 15 at the time when the operation command changes, the longer the period from when the operation command changes to when the second control command value starts increasing. Also, the rate of change β of the second control command value has a negative correlation with the rotational speed of the electric motor 15 at the time when the operation command changes. Accordingly, the higher the rotational speed of the electric motor 15 at the time when the operation command changes, the slower the rate of the increase of the second control command value. As a result, the value R indicating the responsiveness of the electric motor 15 has a negative correlation with the rotational speed of the electric motor 15 at the time when the operation command changes. That is, the lower the rotational speed of the electric motor 15 at the time when the operation command changes, the higher the responsiveness of the electric motor 15. In other words, the responsiveness of the electric motor 15 when the vehicle is stopped is higher than the responsiveness of the electric motor 15 when the vehicle travels.

As described above, in the vehicle drive device 1 according to Embodiment 2 of the present disclosure, the value R indicating the responsiveness of the electric motor 15 has a negative correlation with the rotational speed of the electric motor 15 at the time when the operation command changes, thereby enabling an improvement of the responsiveness of the output of the electric motor 15 at the time of departure of the vehicle while suppressing overload of the internal combustion engine 2. In the vehicle drive device 1 according to Embodiment 2, since the rate of change β in the jerk controller 24 has a negative correlation with the rotational speed of the electric motor 15 at the time when the operation command changes, the response of the output of the electric motor 15 at the time of departure of the vehicle can be further improved.

Embodiment 3

In Embodiments 1 and 2, in order that the value R indicating the responsiveness of the electric motor 15 has a negative correlation with the rotational speed of the electric motor 15 at the time when the operating command changes, the first threshold speed $\omega_{th1}$ is changed using the ratio α having a positive correlation with the rotational speed of the electric motor 15 at the time when the operation command changes. The method for making the value R have the above-described negative correlation is freely selected. For example, the ratio α may be taken to be a fixed value, and the second control command value may be changed based on the rate of change β that changes in accordance with the rotational speed of the electric motor 15. Embodiment 3 in which the ratio α is a fixed value and the rate of change β is changed in accordance with the rotational speed of the electric motor 15 is described below.

Figure 10:
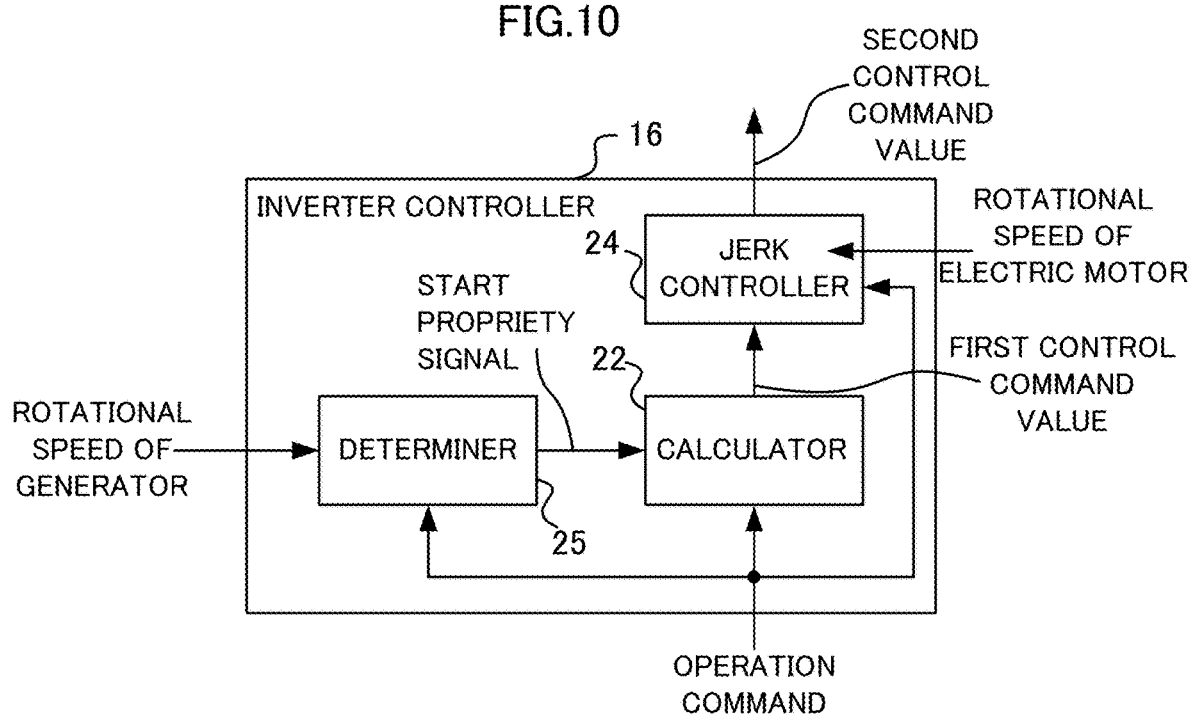
FIG. 10 is a block diagram illustrating a configuration of an inverter controller according to Embodiment 3 of the present disclosure.

The configuration of a vehicle drive device 1 according to Embodiment 3 of the present disclosure is the same as that of the vehicle drive device 1 according to Embodiment 1. The inverter controller 16 included in the vehicle drive device 1 according to Embodiment 3 determines whether to start changing the control command value when the operation command changes, based on whether the rotational speed of the generator 11 is equal to or higher than a second threshold speed. As described later, the second threshold speed is obtained by multiplying the rotational speed of the generator 11 corresponding to the operation command by a positive number equal to or less than 1. Also, the vehicle drive device 1 continuously changes the second control command value in accordance with the rotational speed of the electric motor 15 at the time when the operation command changes. As illustrated in FIG. 10, the inverter controller 16 includes a determiner 25 instead of the determiner 21. The inverter controller 16 includes the jerk controller 24 as in Embodiment 2.

Figure 11:
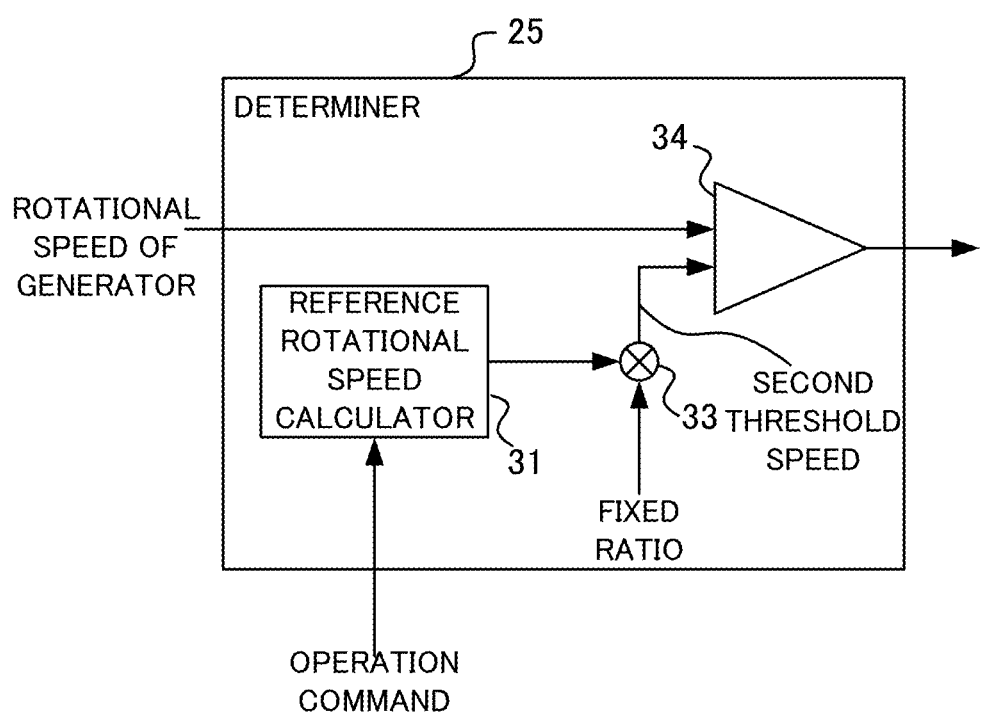
FIG. 11 is a block diagram illustrating a configuration of a determiner according to Embodiment 3.

The determiner 25, based on whether the rotational speed of the generator 11 is equal to or higher than the second threshold speed, determines whether to start changing the control command value when the operation command changes. As illustrated in FIG. 11, the determiner 25 includes (i) the reference rotational speed calculator 31 that calculates the rotational speed of the generator 11 corresponding to the operation command, (ii) the multiplier 33 that outputs a result of multiplying, by a fixed ratio, the rotational speed of the generator 11 calculated by the reference rotational speed calculation unit 31, and (iii) the comparator 34 that compares the rotational speed of the generator 11 with the output of the multiplier 33. The fixed ratio is a positive number equal to or less than 1. The fixed ratio is a constant value regardless of the rotational speed of the electric motor 15.

The reference rotational speed calculator 31 holds the generator speed table as in Embodiment 1. The reference rotational speed calculator 31 calculates, based on the operation command acquired from the master controller and the generator speed table, the rotational speed of the generator 11 corresponding to the operation command. The multiplier 33 outputs the second threshold speed that is a result of multiplying, by the fixed ratio, the rotational speed of the generator 11 calculated by the reference rotational speed calculator 31. The comparator 34 outputs the start propriety signal the signal level of which changes in accordance with the magnitude relationship between the rotational speed of the generator 11 and the second threshold speed. When the rotational speed of the generator 11 is less than the second threshold speed, the start propriety signal is at the L level. When the rotational speed of the generator 11 is equal to or higher than the second threshold speed, the start propriety signal is at the H level.

By the above configuration, when the rotational speed of the generator 11 is less than the second threshold speed, the determiner 25 determines that the second control command value is not started changing, and outputs a start propriety signal at the L level. On the other hand, when the rotational speed of the generator 11 is equal to or higher than the second threshold speed, the determiner 25 determines to start changing the second control command value and outputs a start propriety signal at the H level.

As illustrated in FIG. 10, the calculator 22 acquires the operation command and the start propriety signal output by the determiner 25. The calculator 22 calculates and outputs the first control command value corresponding to the operation command based on the start propriety signal. Specifically, the calculator 22 outputs a first control command value corresponding to the pre-change operation command in the case in which the operation command changes and while the start availability signal is at the L level. On the other hand, in the case in which the operation command changes and the start propriety signal is at the H level, the calculator 22 outputs the first control command value corresponding to the post-change operation command.

The jerk controller 24 acquires the first control command value from the calculator 22. The operation command is input to the jerk controller 24. Also, the jerk controller 24 obtains the rotational speed of the electric motor 15 from the signal output by the speed sensor 18. The configuration and operation of the jerk controller 24 are the same as those in Embodiment 2. When the first control command value changes, the jerk controller 24 continuously changes the second control command value based on the rate of change $\beta$ having a negative correlation with the rotational speed of the electric motor 15 at the time when the operation command changes.

The inverter control performed by the inverter controller 16 is described with reference to FIGS. 12 and 13. These drawings are annotated in the same manner as FIG. 5. An example is described in which the power running notch is input as the operation command to make the railway vehicle start from the state where the brake notch B is input and the railway vehicle is stopped. In the following description, the power running notches of the positions N1 and N2 are denoted as power running notches N1 and N2. In the following example, the power running notch N1 is assumed to be input at a time T11, the vehicle is assumed to depart at a time T12, and the second control command value is assumed to reach the control command value corresponding to the power running notch N1 at a time T13. Additionally, the power running notch N2 is assumed to be input at a time T14, the second control command value is assumed to start increasing at a time T15, and the second control command value is assumed to reach the control command value corresponding to the power running notch N2 at a time T16.

Figure 12:
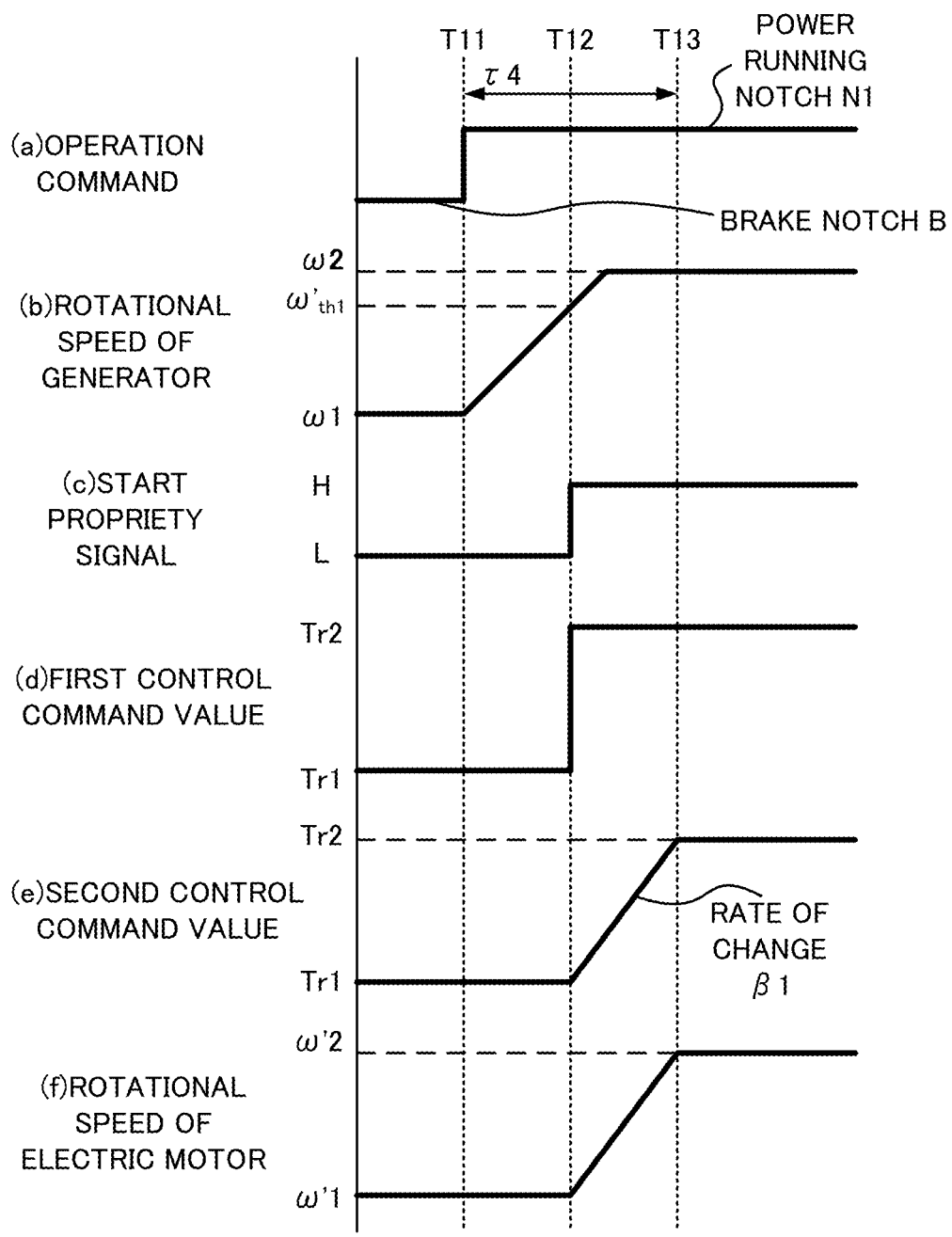
FIG. 12 is a timing chart illustrating a change in a control command value in Embodiment 3.

As illustrated in "(a)" of FIG. 12, the brake notch B as the operation command is input to the vehicle drive device 1 from the master controller until the time T11. Until the time T11, an acceleration of the railway vehicle corresponding to the operation command is zero. The generator 11 is controlled based on the internal combustion engine notch command corresponding to the brake notch B. The rotational speed of the generator 11 is the rotational speed $\omega 1$ (=0) corresponding to the brake notch B. The reference rotational speed calculator 31 calculates the rotational speed of the generator 11 corresponding to the brake notch B to obtain zero as a result of the calculation. Accordingly, the first threshold speed is zero until the time T11. Since the rotational speed of the generator 11 matches the first threshold speed, the start propriety signal is at the H level. The inverter controller 16 outputs the control command value Tr1 (=0) corresponding to the brake notch B. The electric motor 15 is controlled by the control command value Tr1, and the rotational speed of the electric motor 15 is the rotational speed $\omega'1$ (=0) corresponding to the brake notch B.

When the power running notch N1 is input at the time T11, the rotational speed indicated by the internal combustion engine notch command increases. As the internal combustion engine notch command increases, the rotational speed of the generator 11 increases as illustrated in "(b)" of FIG. 12. When the power running notch N1 is input, the reference rotational speed calculation unit 31 calculates and outputs the rotational speed $\omega 2$ of the generator 11 corresponding to the power running notch N1 that is the post-change operation command. The multiplier 33 outputs a second threshold speed $\omega'_{th1}$ that is the result of multiplying the rotational speed $\omega 2$ by a fixed ratio $\gamma$. Since the rotational speed of the generator 11 is less than the second threshold speed $\omega'_{th1}$ until the time T12, the start propriety signal is at the L level as illustrated in "(c)" of FIG. 12. Since the start propriety signal is at the L level until the time T12, the calculator 22 outputs the first control command value Tr1 corresponding to the brake notch B as illustrated in "(d)" of FIG. 12. Accordingly, as illustrated in "(e)" of FIG. 12, the inverter controller 16 outputs the second control command value Tr1 until the time T12. Thus, as illustrated in "(f)" of FIG. 12, the rotational speed of the electric motor 15 remains ω'1.

When the rotational speed of the generator 11 reaches the second threshold speed $\omega'_{th1}$ at the time T12, the start propriety signal reaches the H level. When the start propriety signal reaches the H level, the calculator 22 outputs the first control command value Tr2 corresponding to the power running notch N1. Since the first control command value changes from Tr1 to Tr2, the jerk controller 23 continuously changes the second control command value from Tr1 to Tr2 at the rate of change β1. As the second control command value increases from Tr1 to Tr2, the rotational speed of the electric motor 15 increases from ω'1 to ω'2. At the time T13, the control command value reaches Tr2, and the rotational speed of the electric motor 15 reaches ω'2.

Figure 13:
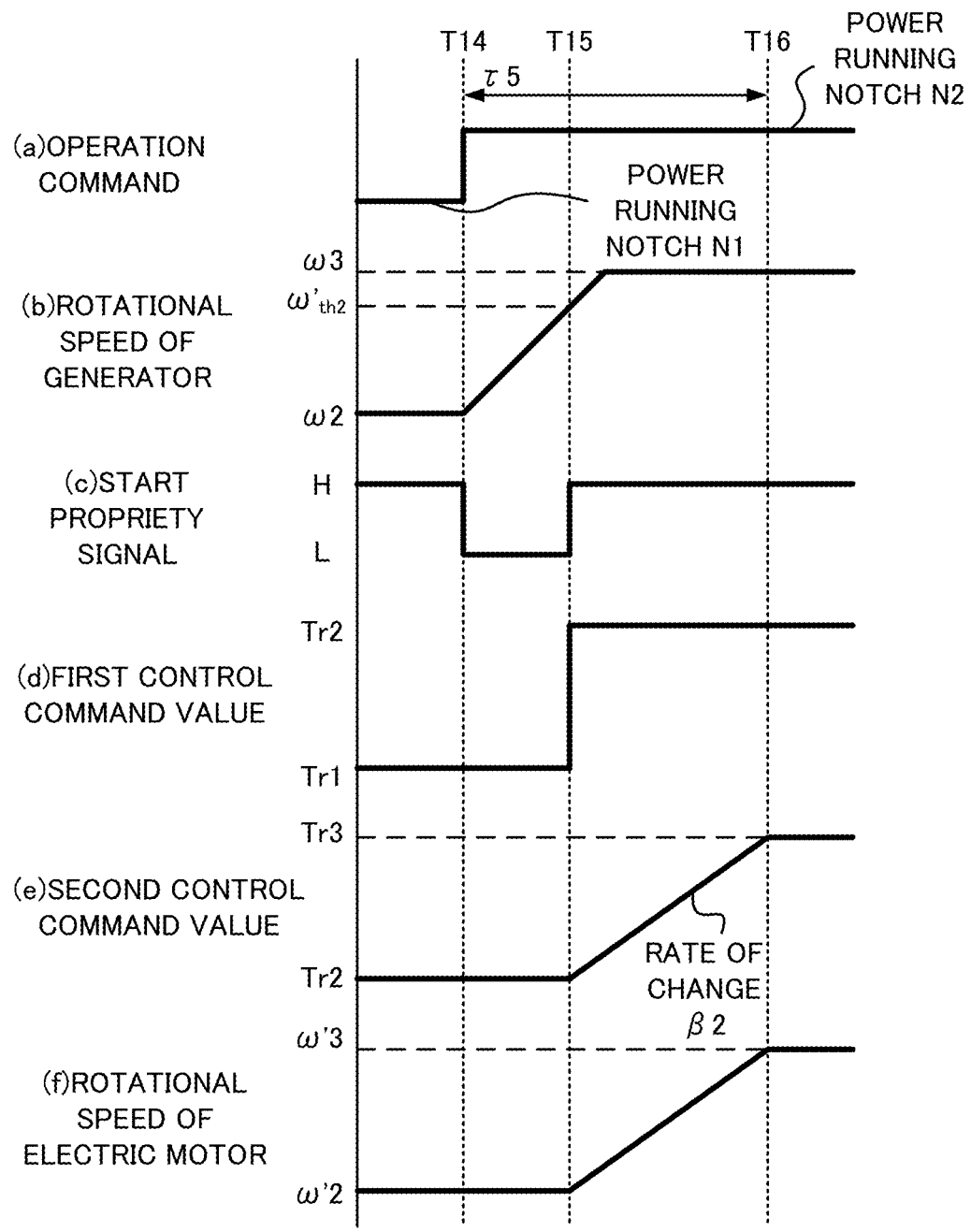
FIG. 13 is a timing chart illustrating a change in the control command value in Embodiment 3.

As illustrated in "(a)" of FIG. 13, the power running notch N1 is input from the time T13 to the time T14, the rotational speed of the generator 11 is ω2 between the time T13 and the time T14, and the rotational speed of the electric motor 15 is ω'2 between the time T13 and the time T14.

At the time T14, the power running notch N2 is input, and the rotational speed indicated by the internal combustion engine notch command increases. As the rotational speed indicated by the internal combustion engine notch command increases, the rotational speed of the generator 11 increases as illustrated in "(b)" of FIG. 13. The rotational speed of the generator 11 increases at the same rate of change as when the power running notch N1 is input. When the power running notch N2 is input, the reference rotational speed calculator 31 calculates and outputs the rotational speed ω3 corresponding to the power running notch N2 that is the post-change operation command. The multiplier 33 outputs a second threshold speed $\omega'_{th2}$ that is the result of multiplying the rotational speed ω3 by the fixed ratio γ. Since the rotational speed of the generator 11 is less than the second threshold speed $\omega'_{th2}$ until the time T15, as illustrated in "(c)" of FIG. 13, the start propriety signal is at the L level. Since the start propriety signal is at the L level until the time T15, the calculator 22 outputs the first control command value Tr2 corresponding to the power running notch N1, as illustrated in "(d)" of FIG. 13. Accordingly, as illustrated in "(e)" of FIG. 13, the inverter controller 16 outputs the second control command value Tr2 until the time T15. Thus, as illustrated in "(f)" of FIG. 13, the rotational speed of the electric motor 15 remains (0'2.

When the rotational speed of the generator 11 reaches the second threshold speed $\omega'_{th2}$ at the time T15, the start propriety signal reaches the H level. When the start propriety signal reaches the H level, the calculator 22 outputs the first control command value Tr3 corresponding to the power running notch N2. Since the first control command value changes from Tr2 to Tr3, the jerk controller 23 continuously changes the second control command value from Tr2 to Tr3 at the rate of change β2. Since the rate of change of the second control command value has a negative correlation with the rotational speed of the electric motor 15 at the time when the operation command changes, the rate of change β2 is less than the rate of change β1. That is, when the second control command value increases from Tr2 to Tr3, the rate of an increase of the second control command value is slower than when the second control command value increases from Tr1 to Tr2. As the second control command value increases from Tr2 to Tr3, the rotational speed of the electric motor 15 increases from ω'2 to ω'3. At the time T16, the second control command value reaches Tr3 and the rotational speed of the electric motor 15 reaches ω'3.

As illustrated in FIG. 12, a symbol τ4 denotes the period from when the operation command changes to when the rotational speed of the electric motor 15 reaches ω'2. In the example of FIG. 12, the second control command value increases from Tr1 to Tr2. That is, the value R1 indicating the responsiveness of the electric motor 15 in the example of FIG. 12 can be represented by (Tr2−Tr1)/τ4. Also, as illustrated in FIG. 13, a symbol τ5 denotes a period from when the operation command changes to when the rotational speed of the electric motor 15 reaches ω'3. In the example of FIG. 13, the second control command value increases from Tr2 to Tr3. That is, the value R2 indicating the responsiveness of the electric motor 15 in the example of FIG. 13 can be represented by (Tr3−Tr2)/τ5. As in Embodiment 2, the rate of change of the second control command value is β and has a negative correlation with the rotational speed of the electric motor 15 at the time when the operation command changes. Accordingly, the higher the rotational speed of the electric motor 15 at the time when the operation command changes becomes, the slower the rate of the increase of the second control command value becomes. As a result, the value R indicating the responsiveness of the electric motor 15 has a negative correlation with the rotational speed of the electric motor 15 at the time when the operation command changes. That is, the lower the rotational speed of the electric motor 15 at the time when the operation command changes, the higher the responsiveness of the electric motor 15. In other words, the responsiveness of the electric motor 15 when the vehicle is stopped is higher than the responsiveness of the electric motor 15 when the vehicle travels.

As described above, in the vehicle drive device 1 according to Embodiment 3 of the present disclosure, the value R indicating the responsiveness of the electric motor 15 has a negative correlation with the rotational speed of the electric motor 15 at the time when the operation command changes, thereby enabling an improvement of responsiveness of the output of the electric motor 15 at the time of departure of the vehicle while suppressing overloading of the internal combustion engine 2.

Embodiments of the present disclosure are not limited to the above-described embodiments. The internal combustion engine 2 is a diesel engine, a gasoline engine, or the like. The inverter controller 16 may acquire the rotational speed of the electric motor 15 from an automatic train control (ATC). The reference rotational speed calculator 31 may calculate, based on a function, the rotational speed of the generator 11 corresponding to the operation command. The ratio determiner 32 may determine the ratio α using a table in which a range of values that the rotational speed of the electric motor 15 can take and the ratio α are associated with each other. The jerk controllers 23 and 24 may continuously change the control command value based on a ramp function, a first-order lag element, or the like. The jerk controller unit 24 may determine the rate of change β using a table in which the range of values that the rotational speed of the electric motor 15 can take and the rate of change β are associated with each other. The first threshold speed $\omega_{th1}$ may be calculated by multiplying, by the ratio α, a value obtained by subtracting the rotational speed of the generator 11 corresponding to the pre-change operation command from the rotational speed of the generator 11 corresponding to the post-change operation command. Similarly, the second threshold speed $\omega_{th2}$ may be calculated by multiplying, by the fixed ratio γ, a value obtained by subtracting the rotational speed of the generator 11 corresponding to the pre-change operation command from the rotational speed of the generator 11 corresponding to the post-change operation command.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Vehicle drive device
2 Internal combustion engine
3 Internal combustion engine controller
11 Generator
12 Converter
13 Filter capacitor
14 Inverter
15 Electric motor
16 Inverter controller
17, 18 Speed sensor
21, 25 Determiner
22 Calculator
23, 24 Jerk controller
31 Reference rotational speed calculator
32 Ratio determiner
33 Multiplier
34 Comparator

The invention claimed is:

1. A vehicle drive device for driving a vehicle using, as a power source, an internal combustion engine controlled in accordance with an operation command, the vehicle drive device comprising:
    a generator to be driven by the internal combustion engine and rotate to output AC power;
    a converter to convert the AC power output by the generator into DC power and output the DC power;
    an inverter to convert the DC power output by the converter into AC power and output the AC power;
    an electric motor to be driven by the AC power output by the inverter and rotate; and
    an inverter controller to (i) calculate a control command value for the inverter in accordance with the operation command and (ii) control the inverter based on the control command value, wherein
    when the operation command changes from a pre-change operation command to a post-change operation command, the inverter controller (i) continuously changes, in accordance with a rotational speed of the electric motor at the time when the operation command changes, the control command value from a control command value corresponding to the pre-change operation command to a control command value corresponding to the post-change operation command and (ii) controls the inverter based on the continuously changed control command value, and
    a value obtained by dividing (i) an amount of the change in the control command value from the control command value corresponding to the pre-change operation command to the control command value corresponding to the post-change operation command in a case of an increase of the operation command by (ii) a period from when the operation command changes to when the control command value reaches the control command value corresponding to the post-change operation command has a negative correlation with the rotational speed of the electric motor at the time when the operation command changes such that the lower an absolute value of the rotational speed of the electric motor at the time when the operation command changes, the higher the value.

2. The vehicle drive device according to claim 1, wherein the inverter controller comprises:
    a determiner to (i) when the operation command changes, determine, based on whether a rotational speed of the generator is equal to or higher than a first threshold speed, whether to start changing the control command value, and (ii) output a start propriety signal indicating a result of the determination;
    a calculator to calculate, based on the start propriety signal, the control command value corresponding to the operation command and output the calculated control command value; and
    a jerk controller to (i) when the control command value output by the calculator changes, continuously change the control command value from the pre-change control command value to the post-change control command value, and (ii) output the continuously changed control command value, wherein
    the first threshold speed is obtained by multiplying the rotational speed of the generator corresponding to the post-change operation command by a ratio having a positive correlation with the rotational speed of the electric motor at the time when the operation command changes,
    when the rotational speed of the generator is equal to or higher than the first threshold speed, the determiner determines to start changing the control command value,
    when the operation command changes and the start propriety signal indicates that the control command value is not started changing, the calculator calculates the control command value corresponding to the pre-change operation command, and
    when the operation command changes and the start propriety signal indicates that the control command value is started changing, the calculator calculates the control command value corresponding to the post-change operation command.

3. The vehicle drive device according to claim 2, wherein the jerk controller continuously changes the control command value based on a rate of change having a negative correlation with the rotational speed of the electric motor at the time when the operation command changes.

4. The vehicle drive device according to claim 1, wherein the inverter controller comprises:
    a determiner to (i) when the operation command changes, determine, based on whether a rotational speed of the generator is equal to or higher than a second threshold speed, whether to start changing the control command value, and (ii) output a start propriety signal indicating a result of the determination;
    a calculator to calculate, based on the start propriety signal, the control command value corresponding to the operation command and output the calculated control command value; and
    a jerk controller to (i) when the control command value output by the calculator changes, continuously change the control command value from the pre-change control command value to the post-change control command value, and (ii) output the continuously changed control command value, wherein the second threshold speed is obtained by multiplying the rotational speed of the generator corresponding to the post-change operation command by a positive number equal to or less than 1, when the rotational speed of the generator is equal to or higher than the second threshold speed, the determiner determines to start changing the control command value, when the operation command changes and the start propriety signal indicates that the control command value is not started changing, the calculator calculates the control command value corresponding to the pre-change operation command, when the operation command changes and the start propriety signal indicates that the control command value is started changing, the calculator calculates the control command value corresponding to the post-change operation command, and the jerk controller continuously changes the control command value based on a rate of change having a negative correlation with the rotational speed of the electric motor at the time when the operation command changes.

* * * * *